(12) United States Patent
Leconte

(10) Patent No.: US 10,279,778 B2
(45) Date of Patent: May 7, 2019

(54) METHOD FOR ASSISTING IN DETERMINING THE POSITION OF AN IDENTIFIER IN RELATION TO A VEHICLE

(71) Applicant: VALEO COMFORT AND DRIVING ASSISTANCE, Créteil (FR)

(72) Inventor: Eric Leconte, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/760,002

(22) PCT Filed: Sep. 16, 2016

(86) PCT No.: PCT/EP2016/072062
§ 371 (c)(1),
(2) Date: Mar. 14, 2018

(87) PCT Pub. No.: WO2017/046387
PCT Pub. Date: Mar. 23, 2017

(65) Prior Publication Data
US 2018/0257607 A1    Sep. 13, 2018

(30) Foreign Application Priority Data
Sep. 18, 2015 (FR) ...................... 15 58834

(51) Int. Cl.
*B60R 25/24* (2013.01)
*G07C 9/00* (2006.01)
(Continued)

(52) U.S. Cl.
CPC ............ *B60R 25/246* (2013.01); *B60R 25/04* (2013.01); *B60R 25/209* (2013.01);
(Continued)

(58) Field of Classification Search
CPC ....... B60R 25/24; B60R 25/04; B60R 25/246; B60R 25/209; G07C 9/00; G07C 9/00182
(Continued)

(56) References Cited

U.S. PATENT DOCUMENTS

| | | | | |
|---|---|---|---|---|
| 7,082,359 B2 * | 7/2006 | Breed | ................... | G07C 5/008 701/31.5 |
| 2003/0176959 A1 * | 9/2003 | Breed | .................. | B60N 2/0232 701/36 |

FOREIGN PATENT DOCUMENTS

| | | |
|---|---|---|
| EP | 1721792 A1 | 11/2006 |
| FR | 2971386 A1 | 8/2012 |

OTHER PUBLICATIONS

International Search Report issued in PCT/EP2016/072062 dated Mar. 15, 2017 (3 pages).
(Continued)

*Primary Examiner* — Tan Q Nguyen
(74) *Attorney, Agent, or Firm* — Osha Liang LLP

(57) ABSTRACT

The invention relates to a method (METH) for assisting in determining the position of an identifier (I) for accessing and starting a vehicle (V), relative to the vehicle (V), comprising: transmission ($Em\_TS_{vp}$), from a first device, either the vehicle (V) or the identifier (I) to a second device, different from the first, either the vehicle (V) or the identifier (I), at a transmission time t0, of an initial train ($TS_{vp}$) of N sinusoidal signals, having identical amplitudes and respective frequencies $f_p$, p∈[1;N], for any p between 1 and N−1; reception ($Rec\_TS_{vp}'$) by the second device of an image train ($TS_{vp}'$) corresponding to the initial train ($TS_{vp}$, $TS_{ip}$) altered by the transmission ($Em\_TS_{vp}$); construction ($Cons\_Sp_v$) of a frequency spectrum ($Sp_v$) for the image train ($TS_{vp}'$); inverse Fourier transformation ($TFI\_Sp_v$) of the spectrum ($Sp_v$), allowing a time signature ($Sg_v$) to be obtained; first integration ($Int1\_Sg_v$) of the time signature ($Sg_v$), between
(Continued)

the transmission time $t_0$ and a pre-determined intermediate time $t_{int}$, producing a first result (Rlt1); second integration (Int2_Sg v) of the time signature ($Sg_v$) between the intermediate time $t_{int}$ and a pre-determined end time $t_f$, producing a second result (Rlt2); comparison (Comp_1/2) of a ratio (R) of the first result (Rlt1) to the second result (Rlt2) with a threshold value (S), so that it is possible to determine if the identifier (I) is positioned inside the vehicle (V).

6 Claims, 3 Drawing Sheets

(51) Int. Cl.
*B60R 25/04* (2013.01)
*B60R 25/20* (2013.01)

(52) U.S. Cl.
CPC .......... *G07C 9/00182* (2013.01); *B60R 25/24* (2013.01); *G07C 2209/61* (2013.01); *G07C 2209/63* (2013.01)

(58) Field of Classification Search
USPC .................................................. 701/2
See application file for complete search history.

(56) References Cited

OTHER PUBLICATIONS

Written Opinion of the International Searching Authority issued in PCT/EP2016/072062 dated Mar. 15, 2017 (6 pages).
Prokes, A. et al.; "Intra-Vehicle Ranging in Ultra-Wide and Millimeter Wave Bands"; 2015 IEEE Asia Pacific Conference on Wireless and Mobile (APWIMOB) Aug. 27, 2015 (5 pages).

* cited by examiner

METHOD FOR ASSISTING IN DETERMINING THE POSITION OF AN IDENTIFIER IN RELATION TO A VEHICLE

TECHNICAL FIELD OF THE INVENTION

The technical field of the invention is, in general, hands-free access and starting systems for vehicles. The invention relates more particularly to a method for assisting in determining a position of a hands-free identifier that makes it possible to access the vehicle and/or to start the vehicle.

PRIOR ART

What are termed "hands-free" access and starting systems, allowing the doors of a vehicle to be locked and unlocked and the vehicle engine to be started without the use of a traditional key, are nowadays widespread on the market.

Conventionally, when a user wishing to unlock a door of a vehicle touches a capacitive sensor or is detected by an infrared sensor situated on the door handle, a central computer of the vehicle triggers the transmission of a low-frequency (between 20 and 150 kHz) interrogation signal by a low-frequency antenna of the vehicle. As an alternative, the low-frequency antenna may send such low-frequency interrogation signals periodically (reference is made to "polling"). If an identifier (which conventionally takes the form of a key or an electronic card, or even a smartphone having a suitable activated application) in the proximity of the vehicle captures an interrogation signal, it responds by sending an unlocking code to the central computer by radio signal. A radio receiver of the vehicle then receives the radio signal: if the locking code is recognized by the central computer, then the latter orders the unlocking of the door.

The method is substantially the same when the user wishes to start the vehicle and presses a switch situated in the passenger compartment: in this case, the engine is started by the central computer only if a starting code sent by the identifier is recognized by the central computer.

To increase the security of hands-free access and starting systems, it is desirable for additional conditions to be met before locking, unlocking or starting is triggered. It is desirable in particular for the location of the identifier to be in keeping with the action to be performed, for example:
 For locking, there should be no identifier located inside the passenger compartment
 For starting, the identifier should be located inside the passenger compartment.

It is thus necessary to detect whether the identifier is inside or outside the vehicle.

It is known to use IR-UWB (impulse radio ultra-wideband) technology to determine whether or not an identifier is located inside a vehicle, by way of measuring signal propagation time (or 'time-of-flight'). In this method, a first UWB transceiver, situated at the vehicle, sends a pulse, by radio signal, at a time $t_0$, which pulse is received by a second UWB transceiver belonging to the identifier. Now, due to the refractions and reflections to which the wave that is sent is subjected on its path, the second transceiver receives not only the direct pulse but also signals of the pulse coming from multiple paths. The total signal that is received is commonly called the signature. The second transceiver dates the maximum amplitude of the signature, which corresponds a priori to the time $t_1$ of receipt of the direct pulse. Next, the second transceiver returns the information $t_1$ to the first transceiver. Depending on the difference $t_1-t_0$, a computer of the vehicle then determines whether the identifier is positioned inside or outside the vehicle.

This method has drawbacks, however. First of all, the system requires very quick and accurate clocks in order to date the transmissions and the receptions. In addition, a high consumption of energy is required on the part of the receivers, the latter having to receive very weak signals shrouded in noise. Lastly, the power required to generate the pulses is very high. The autonomy of the transceiver devices is therefore affected.

GENERAL DESCRIPTION OF THE INVENTION

The aim of the invention is therefore to propose a position determination method that overcomes the aforementioned drawbacks.

To this end, the invention proposes a method for assisting in determining a position of an identifier for accessing and starting a vehicle, in relation to said vehicle, comprising:
 Transmission, between the vehicle and the identifier, at a transmission time $t_0$, of an initial train of N sinusoidal signals, with identical amplitudes and with respective frequencies $f_p$, $p \in [1;N]$, such that, for all values of p between 1 and N−1,
 Reception of an image train corresponding to the initial train altered by the transmission
 Construction of a frequency spectrum of the image train
 An inverse Fourier transform of the spectrum, making it possible to obtain a temporal signature
 A first integration of the temporal signature, between the transmission time $t_0$ and a predetermined intermediate time $t_{int}$, giving a first result
 A second integration of the temporal signature, between the intermediate time $t_{int}$ and a predetermined final time $t_f$, giving a second result
 Comparison of a ratio of the first result to the second result with a threshold value, making it possible to determine whether the identifier is positioned inside the vehicle.

Transmission between the vehicle and the identifier is understood to mean transmission from the vehicle to the identifier or from the identifier to the vehicle.

Transmitting a train of sinusoidal signals, with identical amplitudes and regularly spaced frequencies, is equivalent to transmitting a pulse.

The higher the ratio between the first result and the second result, the greater the likelihood of the identifier being positioned inside the vehicle. On the basis of the result of the comparison and of a function (starting or opening of a door, for example) to be performed, it is possible to determine whether or not the function should be authorized.

Besides the features that have just been outlined in the previous paragraph, the method according to the invention may have one or more additional features from among the following, which are considered individually or in any technically feasible combination.

In one nonlimiting embodiment, the intermediate time $t_{int}$ is such that the temporal signature, between the transmission time $t_0$ and the intermediate time $t_{int}$, comprises a first reception lobe corresponding to a direct path between the identifier and the vehicle.

In one nonlimiting embodiment, the final time $t_f$ is such that the temporal signature, between the intermediate time $t_{int}$ and the final time $t_f$, comprises secondary reception lobes corresponding to reflected and/or refracted paths between the identifier and the vehicle.

In one nonlimiting embodiment, the method includes a step of multiplying the ratio of the first result to the second result by $(t_f-t_{int})/(t_{int}-t_0)$, and a step of comparing the result of the multiplication with the threshold value.

In one nonlimiting embodiment, the threshold value is greater than 10.

In one nonlimiting embodiment, the frequencies $f_p$ are such that N=80, $f_1$=2400 MHz and, for all values of p between 1 and 79, $f_{p+1}-f_p$=1 MHz. The associated frequency range corresponds to Bluetooth. The transmitter of the vehicle and the receiver of the identifier may thus be integrated into Bluetooth chips (integrated circuits able to be used in transmitter or receiver mode). It is noted that a smartphone natively includes a Bluetooth chip, thereby making it a particularly suitable identifier for implementing the method according to the invention.

The invention and the various applications thereof will be better understood on reading the following description and on examining the accompanying figures.

BRIEF DESCRIPTION OF THE FIGURES

The figures are presented only by way of entirely non-limiting indication of the invention. In the figures.

DETAILED DESCRIPTION OF AT LEAST ONE EMBODIMENT OF THE INVENTION

Unless indicated otherwise, one and the same element appearing in different figures has a single reference.

The method described hereinafter makes it possible to determine whether what is termed a hands-free identifier I, said identifier I making it possible to control, using a "hands-free" principle, access to or starting of a vehicle V, is positioned inside said vehicle V. The identifier I is for example an electronic key or card, or a smartphone having a suitable application.

The vehicle V includes a first transceiver device Dv, and the identifier I includes a second transceiver device Di.

Figure 1:
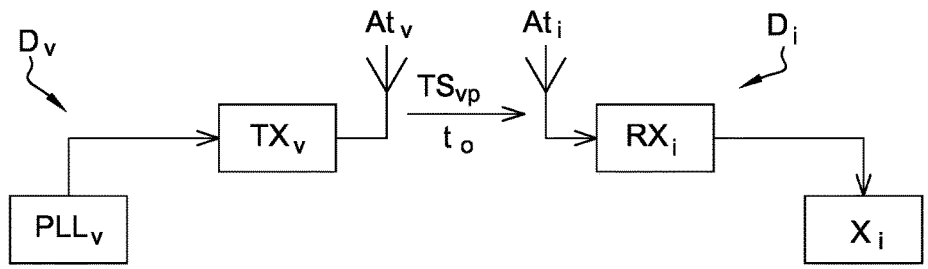
FIG. 1 shows two transceiver devices belonging to a vehicle and an identifier, respectively, between which it is desired to know the respective position, the devices being designed to implement a method according to one embodiment of the invention.

With reference to FIG. 1, the first transceiver device Dv of the vehicle V includes:
- a transmitter TXv of radio signals (with a frequency at least equal to 1 GHz)
- an antenna Atv to which the transmitter TXv is connected
- a phase-locked loop PLLv for supplying signals of various frequencies to the transmitter TXv.

The second transceiver device Di of the identifier I moreover includes:
- a receiver RXi of radio signals (with a frequency at least equal to 1 GHz)
- an antenna Ati to which the receiver RXi is connected
- a computer Xi for performing calculations on the basis of signals received by the receiver RXi.

It is noted that a smartphone natively has all of the components of the described transceiver device Di. In one preferred embodiment, the identifier I is therefore a smartphone having a suitable application for the hands-free accessing and starting of the vehicle. The various components of the transceiver device Di are advantageously triggered and controlled by the application installed on the smartphone.

The method according to the invention is implemented by the first transceiver device Dv and the second transceiver device Di. It is noted that the first transceiver device Dv and the second transceiver device Di have been synchronized with one another beforehand, for example via a Bluetooth Low Energy protocol (it is noted that a smartphone natively has a Bluetooth chip).

Figure 2:
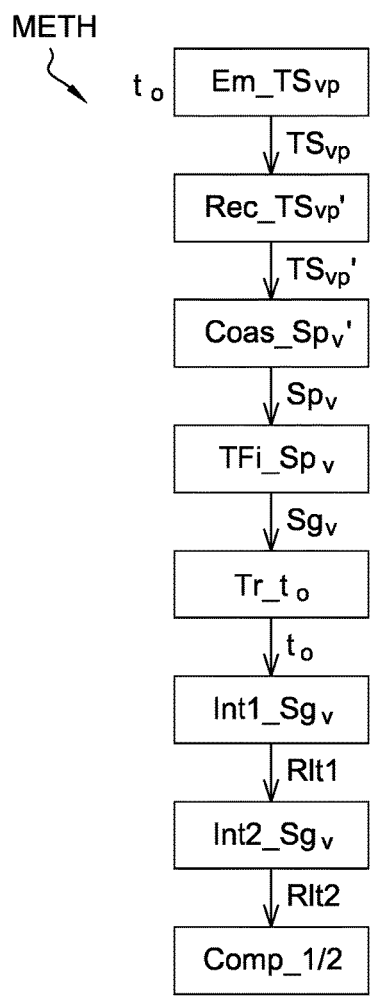
FIG. 2 shows a block diagram showing steps of the method.
Figure 3:
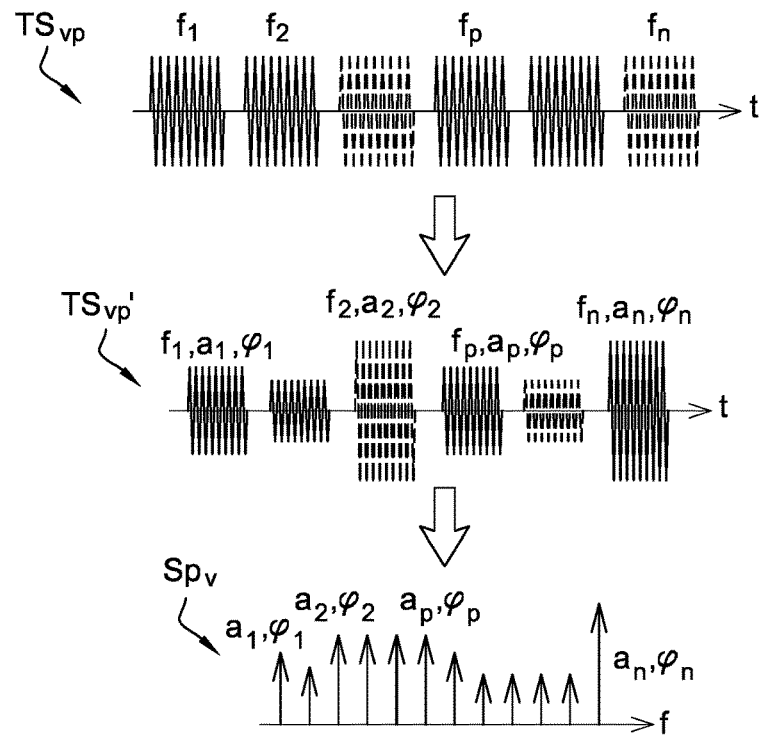
FIG. 3 shows signals exchanged between the transceiver devices during steps of the method.
Figure 4:
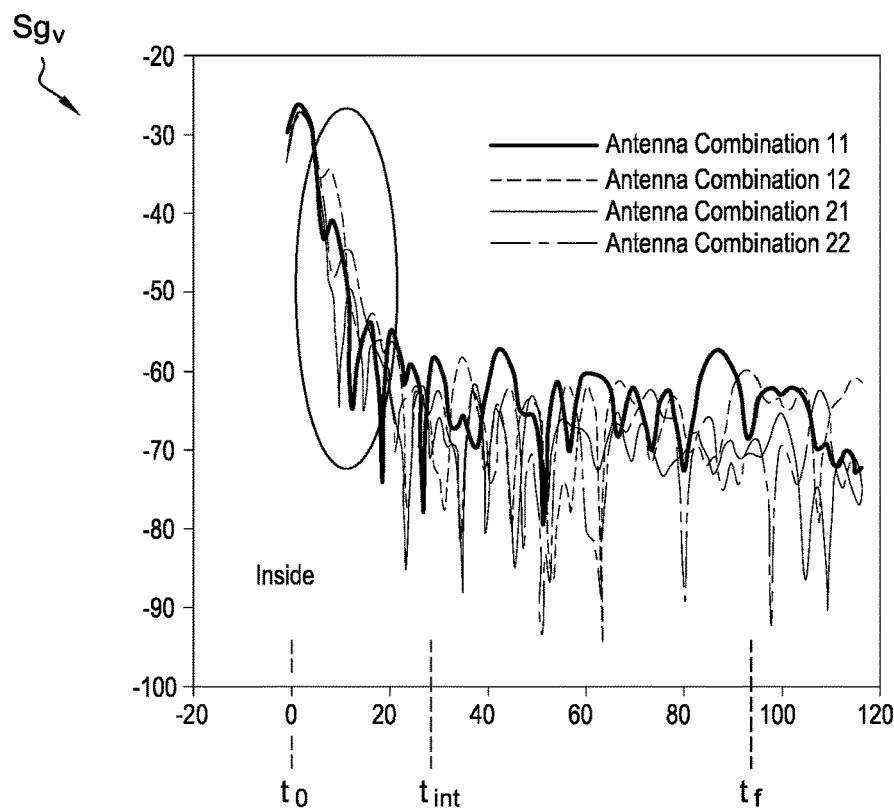
FIG. 4 shows a signature, obtained during a step of the method, characteristic of an identifier positioned inside the vehicle.
Figure 5:
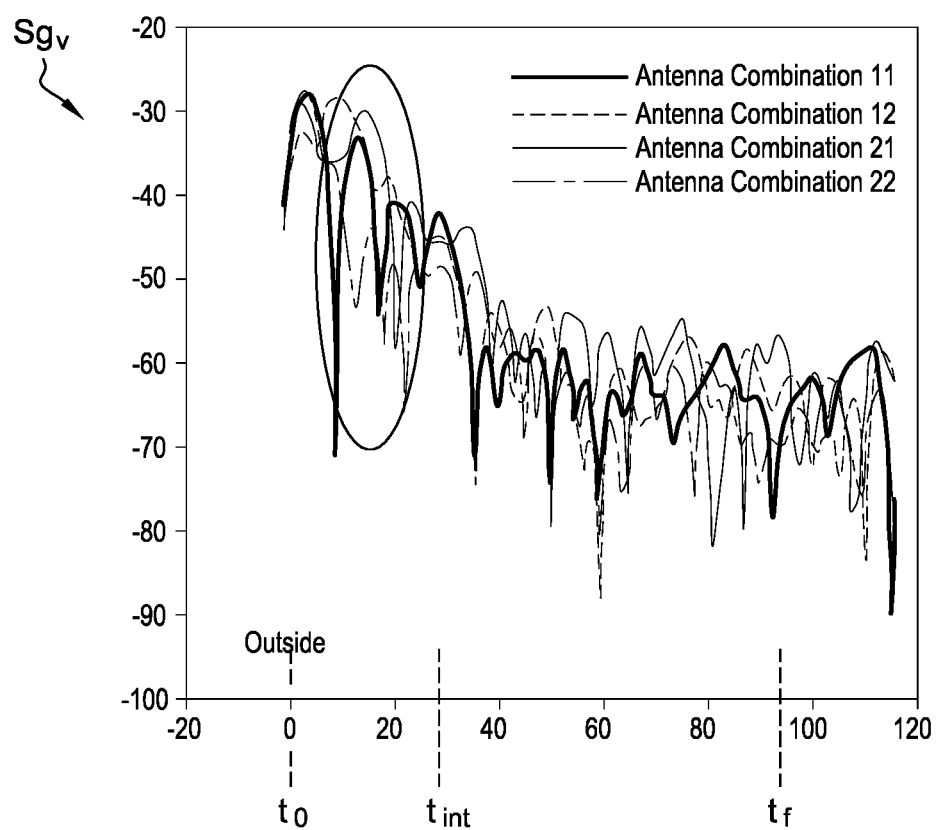
FIG. 5 shows a signature, obtained during a step of the method, characteristic of an identifier positioned outside the vehicle.

With reference to FIG. 2, the method METH includes the following steps.

at a time $t_0$, transmission $Em\_TS_{vp}$, from the transmitter TXv of the vehicle V to the receiver RXi of the identifier I, of an initial train $TS_{vp}$ of N first sinusoidal signals $S_{vp}$ with identical phases and amplitudes, and with respective frequencies $f_p$, $p \in [1;N]$. The initial train $TS_{vp}$ is shown in FIG. 3. Advantageously, the frequencies $f_p$ are such that N=80, $f_1$=2.4 GHz, $f_{80}$=2.480 GHz and, for all values of p between 1 and 79, $f_{p+1}-f_p$=1 MHz. Specifically, these frequencies correspond to the Bluetooth Low Energy channels. It is noted that the initial train $TS_{vp}$ is generated by the phase-locked loop PLLv of the vehicle V.

reception $Rec\_TS_{vp}'$, by the receiver RXi of the identifier I, of an image train $TS_{vp}'$ corresponding to the initial train $TS_{vp}$ altered by the transmission $Em\_TS_{vp}$. The image train $TS_{vp}'$ is shown in FIG. 3. The image train $TS_{vp}'$ is formed of N image sinusoidal signals $S_{vp}'$ with phases $\varphi_p$, amplitudes $a_p$ and frequencies $f_p$, $p \in [1;N]$, respectively. If the frequencies $f_p$ of the first signals $S_{vp}$ are not altered by the transmission, their amplitude and their phase are altered. Specifically, the reflection and refraction phenomena to which the signals are subjected between the transmitter TXv of the vehicle V and the receiver RXi of the identifier I shift phase and modify the amplitude of the signals.

construction $Cons\_Sp_v$ of a frequency spectrum $Sp_v$ of the image train $TS_{vp}'$, through detection of the spectral lines of the image train $TS_{vp}'$. The spectrum $Sp_v$ is shown in FIG. 3.

an inverse Fourier transform $TFI\_Sp_v$ making it possible to obtain a temporal signature $Sg_v$. The first temporal signature $Sg_v$ is equivalent to the one that would have been obtained if a pulse had been transmitted instead of the initial train $TS_{vp}$. A spectrum characteristic of an identifier inside a vehicle is shown in FIG. 4, while a spectrum characteristic of an identifier outside a vehicle is shown in FIG. 5. It is noted that the amplitudes of the signature in a region close to the time corresponding to the direct travel time of the wave between the transmitter and the receiver are higher when the identifier is inside the vehicle.

transmission $Tr\_t_0$, from the transmitter TXv of the vehicle V to the receiver RXi of the identifier I, of the transmission time $t_0$.

a first integration $Int1\_Sg_v$ of the temporal signature $Sg_v$, between the transmission time $t_0$ and a predetermined intermediate time $t_{int}$, giving a first result Rlt1. The intermediate time $t_{int}$, in seconds, is advantageously the one corresponding to the direct wave path, that is to say the distance between the transceiver of the vehicle and of the identifier. It is noted that the first integration Int1_Sg$_v$ is performed by the computer Xi of the identifier.

a second integration Int2_Sg$_v$ of the temporal signature Sg$_v$, between the intermediate time t$_{int}$ and a predetermined final time t$_f$ giving a second result Rlt2. The final time t$_f$ in seconds, is advantageously the time allowing all of the reflected and/or refracted waves to arrive at the identifier. It is noted that the second integration Int2_Sg$_v$ is performed by the computer Xi of the identifier. It is noted that the results Rlt1, Rlt2 of the integrations Int1_Sg$_v$, Int2_Sg$_v$ may possibly be divided by the time t$_{int}$–t$_0$ and the time t$_f$–t$_{int}$, respectively. This makes it possible to have a basis for comparing the results Rlt1 and Rlt2 that is independent of the intermediate time t$_{int}$ and the final time t$_1$.

comparison Comp_1/2 of a ratio R of the first result Rlt1 (possibly divided by t$_{int}$–t$_0$) to the second result Rlt2 (possibly divided by t$_f$–t$_{int}$) with a threshold value S. The threshold value S is a value beyond which the likelihood of the identifier I being positioned inside the vehicle V is high. The greater the threshold value S, the more reliable the result of the positioning via the method METH according to the invention. If the ratio R is greater than the threshold value S, then the identifier I is determined to be positioned inside the vehicle V. The threshold value S is advantageously greater than 10, so the identifier I is determined to be positioned inside the vehicle V if the first result Rlt1 is at least ten times greater than the second result Rlt2.

On the basis of the result of the comparison, and depending on a specific requested function (opening of a door, closure of a door, starting of the vehicle, for example), the computer Xi of the identifier I is able to determine whether or not the function should be performed. This information may then be relayed to the vehicle V.

It is noted that the method METH could, as an alternative, not comprise the step of transmission Tr_t$_0$, from the transmitter TXv of the vehicle V to the receiver RXi of the identifier, of the transmission time t$_0$. The method would then comprise a step of transmission, from the transmitter TXi of the identifier I to the receiver RXv of the vehicle V, of the temporal signature Sg$_v$. The integrations Int1_Sg$_v$, Int2_Sg$_v$ and the comparison Comp_1/2 would then be performed by a computer Xv of the vehicle V.

Naturally, the steps of the method could, as an alternative, be performed in another technically feasible order than the one presented above. Moreover, the transmission steps Em_TS$_{vp}$, Tr_Dat could, as an alternative, be performed from the identifier I to the vehicle V. The other steps would then be performed by the vehicle V. As an alternative, the steps could be performed by both the identifier I and the vehicle V.

The invention claimed is:

1. A method for assisting in determining a position of an identifier for accessing and starting a vehicle, in relation to said vehicle, the method comprising:
    transmission, from a first device from among the vehicle and the identifier, to a second device, separate from the first, from among the vehicle and the identifier, at a transmission time t$_0$, of an initial train of N sinusoidal signals, with identical amplitudes and with respective frequencies f$_p$, p∈[1;N], such that, for all values of p between 1 and N–1:
    reception, by the second device, of an image train corresponding to the initial train altered by the transmission,
    construction of a frequency spectrum of the image train,
    an inverse Fourier transform of the spectrum to obtain a temporal signature
    a first integration of the temporal signature, between the transmission time and a predetermined intermediate time t$_{int}$, to obtain a first result
    a second integration of the temporal signature, between the intermediate time and a predetermined final time t$_f$, to obtain a second result, and
    comparison of a ratio of the first result to the second result with a threshold value, to determine whether the identifier is positioned inside the vehicle.

2. The method as claimed in claim 1, wherein the intermediate time t$_{int}$ is such that the temporal signature, between the transmission time and the intermediate time, comprises a first reception lobe corresponding to a direct path between the identifier and the vehicle.

3. The method as claimed in claim 1, wherein the final time is such that the temporal signature, between the intermediate time and the final time, comprises secondary reception lobes corresponding to reflected and/or refracted paths between the identifier and the vehicle.

4. The method as claimed in claim 1, further comprising a step of multiplying the ratio by (t$_f$–t$_{int}$)/(t$_{int}$–t$_0$), and a step of comparing the result of the multiplication with the threshold value.

5. The method as claimed in claim 1, wherein the threshold value is greater than 10.

6. The method as claimed in claim 1, wherein the frequencies f$_p$ are such that N=80, f1=2400 MHz and, for all values of p between 1 and 79, f$_{p+1}$–f$_p$=1 MHz.

* * * * *